US009542862B2

(12) United States Patent
Shim et al.

(10) Patent No.: US 9,542,862 B2
(45) Date of Patent: Jan. 10, 2017

(54) PRESSURE FEEDBACK NETWORK FOR ABDOMINAL SIMULATOR SYSTEM

(71) Applicant: SMARTUMMY LLC, Honolulu, HI (US)

(72) Inventors: Walton Shim, Honolulu, HI (US); Larry Martin, Herndon, VA (US); John Salle, Honolulu, HI (US)

(73) Assignee: SmarTummy LLC, Honolulu, HI (US)

( * ) Notice: Subject to any disclaimer, the term of this patent is extended or adjusted under 35 U.S.C. 154(b) by 0 days.

(21) Appl. No.: 15/149,546

(22) Filed: May 9, 2016

(65) Prior Publication Data

US 2016/0314719 A1    Oct. 27, 2016

Related U.S. Application Data

(63) Continuation of application No. 14/695,603, filed on Apr. 24, 2015, now Pat. No. 9,336,694, which is a continuation of application No. 13/965,143, filed on Aug. 12, 2013, now Pat. No. 9,087,458.

(60) Provisional application No. 61/799,471, filed on Mar. 15, 2013.

(51) Int. Cl.
   *G09B 23/32* (2006.01)
   *G09B 9/00* (2006.01)

(52) U.S. Cl.
   CPC ............. *G09B 23/32* (2013.01); *G09B 9/00* (2013.01)

(58) Field of Classification Search
   CPC ......... G08B 23/28; G08B 23/32; G08B 23/36; G08B 9/00
   See application file for complete search history.

(56) References Cited

U.S. PATENT DOCUMENTS

| 5,957,694 | A  | 9/1999  | Bunch     |
|-----------|----|---------|-----------|
| 6,461,165 | B1 | 10/2002 | Takashina |
| 2002/0076681 | A1 | 6/2002 | Leight    |
| 2007/0003917 | A1 | 1/2007 | Kitching  |

OTHER PUBLICATIONS

Mahaboob, "Developing the NUS Tummy Dummy", Annals Academy of Medicine, 2010, vol. 39, No. 2, pp. 150-151.
Burrows et al., "ABSIM: Abdominal Palpation Training System", SBME: Medicine & Engineering, Aug. 2011.
PCT Intl Preliminary Report on Patentability, in corresponding PCT Appl. US2014/0029648, dated Jul. 7, 2014.

*Primary Examiner* — Timothy A Musselman
(74) *Attorney, Agent, or Firm* — Leignton K. Chong

(57) ABSTRACT

A dynamically-changeable abdominal simulator system comprises a patient manikin having an abdominal cavity covered by a sheet of synthetic skin, an array of inflatable elements emplaced within the abdominal cavity covering respectively distinct areas of pressurization of the abdominal cavity and supplied with pressurized medium under separate and independent inflation control for each of the inflatable elements in order to simulate a wide range of abdominal ailments and/or conditional expressions thereof. An inflation manifold and an electronic control module operable therewith control the supply of pressurized medium to the inflatable elements. The electronic control module can communicate with an external computer that provides a graphical user interface (GUI) for the user to control the training simulation routines to be performed on the manikin.

6 Claims, 13 Drawing Sheets

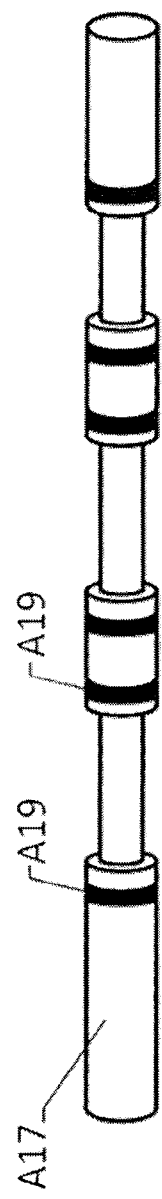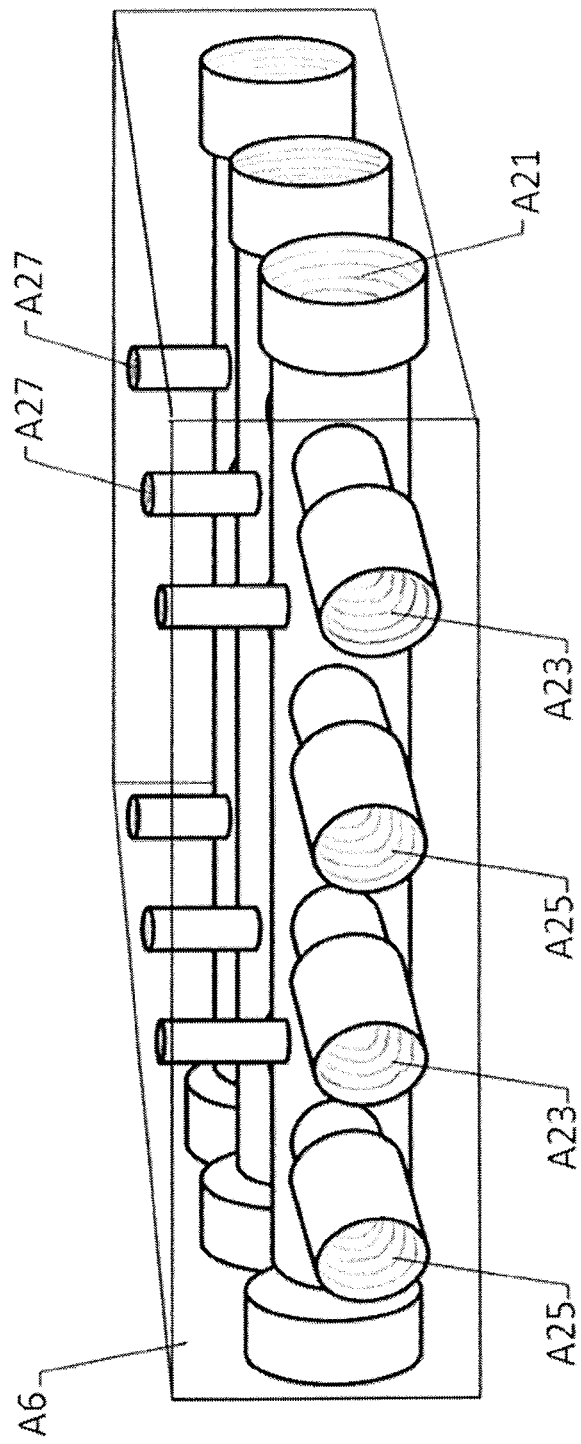
FIG. 6A
FIG. 6B

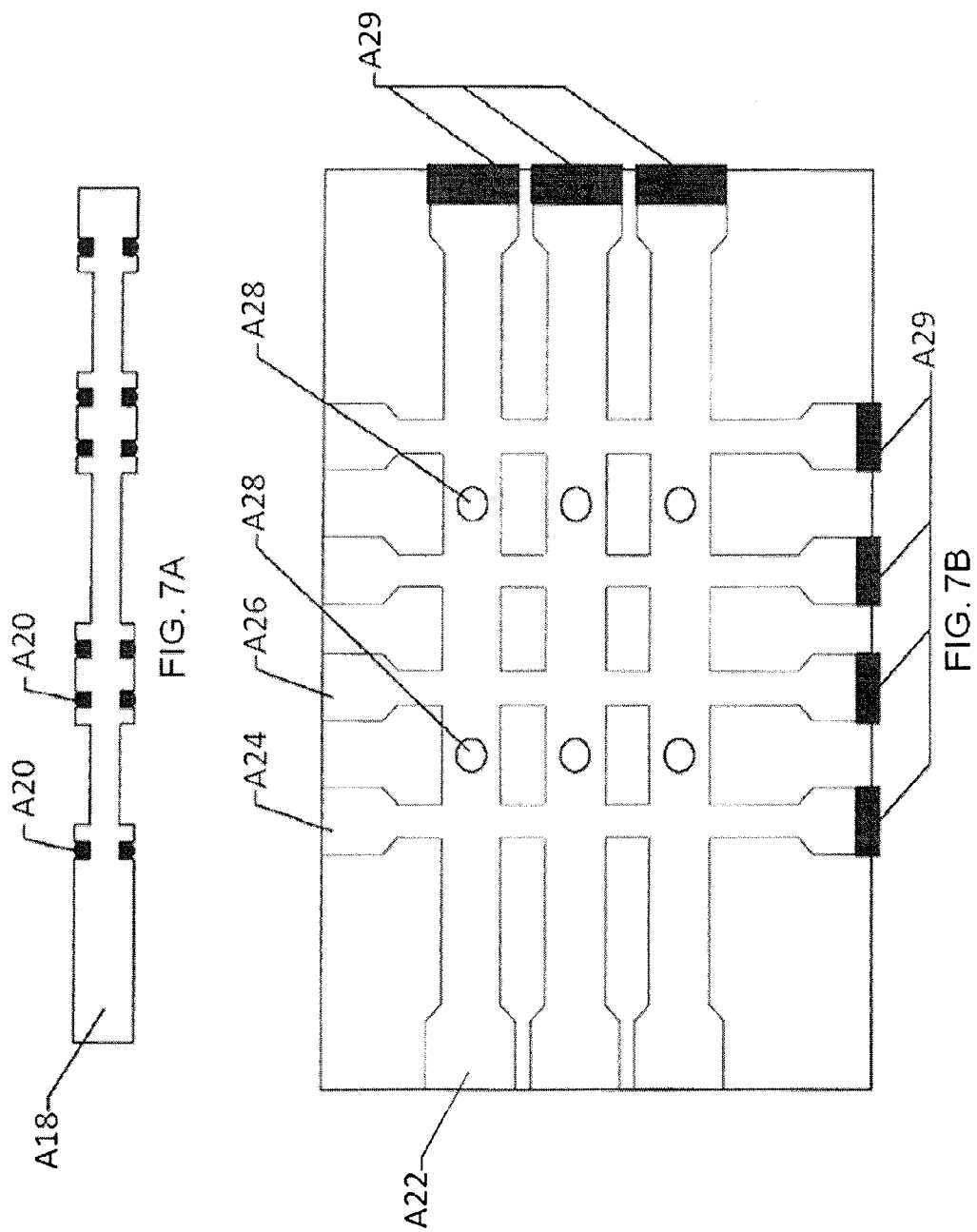

PRESSURE FEEDBACK NETWORK FOR ABDOMINAL SIMULATOR SYSTEM

This U.S. patent application claims the priority filing date of and is a continuation of U.S. patent application Ser. No. 14/695,603 filed Apr. 24, 2015, now issued as U.S. Pat. No. 9,336,694 on May 10, 2016, which was a continuation of U.S. patent application Ser. No. 13/965,143 filed Aug. 12, 2013, now issued as U.S. Pat. No. 9,087,458 on Jul. 21, 2015, which claimed the priority benefit of U.S. Provisional Application 61/799,471 filed on Mar. 15, 2013, having inventors in common herewith, both of which are incorporated by reference herein.

BACKGROUND OF INVENTION

The invention in this U.S. patent application relates to the field of biomedical simulation devices, and more specifically, to a patient simulator manikin for training for abdominal palpation examination.

While many different types of patient manikin training simulators are available in today's market, they are generally limited by having one or more static or single-function organs or body elements for simulating a single, specific subject condition for medical students, nurses and paramedics to train on. A patient manikin simulator called "Sim-Man", which is commercially available from Laerdal Medical AS, Wappingers Falls, N.Y., enables a training host to simulate a specific abdominal ailment, but is unable to replicate other abdominal disorders, such as appendicitis, ectopic pregnancy, and cancer of the abdomen. Commercially marketed simulators currently available are purely static and require a manual change to reconfigure the abdomen contents to simulate a different disorder. For example, to simulate a distended bladder, the "healthy" bladder model would be removed from the torso and replaced with a "distended" version. To simulate a different condition or a dynamically changing condition, different abdominal organ models or body elements must be manually interchanged into the manikin abdominal cavity.

In order for trainees to gain a wide range of experience training on a patient manikin simulator, it is deemed desirable to provide a patient manikin simulator that can simulate a wide range of different or dynamically changing medical conditions, without having to manually interchange abdominal organ models or body elements.

SUMMARY OF INVENTION

In accordance with the present invention, a dynamically-changeable abdominal simulator system comprises a patient manikin having an abdominal cavity covered by a sheet of synthetic skin, which contains an array of inflatable elements covering distinct areas of pressurization over the length and width of the abdominal cavity. The inflatable elements are separately and independently supplied with a pressurized medium so that they can be dynamically configured to simulate a wide range of abdominal ailments and/or conditional expressions thereof, thereby providing an effective simulator training tool for practicing abdominal palpation exams. The inflation system for pressurization of the array of inflatable elements employs an electronic control module with an on-board microprocessor. The electronic control module communicates with an external computer that provides a graphical user interface for the user to run software-programmed simulation routines in conjunction with the operation of the manikin.

In a preferred embodiment, the array of inflatable elements is arranged as a grid of inflatable cells in a plurality of x rows and y columns defining distinct unit areas of pressurization. An inflation manifold employs x-y electronically controlled valves controlled by the electronic control module to inject pressurized medium into or discharge it from the inflatable cells. The electronic control module is embedded in the manikin with the inflation manifold for portability, and communicates with an external computer, laptop, or mobile device that provides a graphical user interface (GUI) for the user to run software-programmed simulation routines. The GUI interface is designed to allow a user to readily select from a wide range of abdominal ailments and to operate the inflation system under software control. This enables the array of inflatable elements to be dynamically configured in the manikin's abdominal cavity to mimic any selected ailment and/or conditional expressions thereof. For example, an abdominal ailment such as hepatomegaly (enlarged liver) can be simulated by inflating several cells in the liver's position of the grid-array with varying pressures to replicate the outline shape and feel of a hepatomegaly condition.

In a particularly preferred embodiment, the synthetic skin covers the manikin torso from the chest down to the pubis. Underneath the skin layer are several synthetic bone structures that will emulate the ribcage and iliac crests and are fused to the manikin torso. Additionally, the abdominal cavity contains a grid of inflatables made of rigid material to retain their shape and spanning the entire abdominal cavity. The inflatables are fixated in position at the top and bottom faces. Attached to the bottom of the abdominal cavity is an inflatable grid support structure that mimics the contour of the abdominal cavity. Tubing for each inflatable runs through the grid-like support structure and attaches to each inflatable. The top of each inflatable is fused to a single membrane of low elastic modulous material that spans the abdominal cavity region. This membrane is attached to the underside of the manikin walls to keep the inflatables fixated in place. Inflation is accomplished using a manifold system capable of both hydraulic and pneumatic fluid flow connected to the inflatables via tubing. The manifold is engineered using moveable piston shafts and either hydraulic or pneumatic valves aligned in a row/column format where each piston shaft is individually controlled using an electronic actuator that is either a liner actuator, push/pull solenoid, air valve, or the like. The hydraulic or pneumatic valves are also electronic and individually controlled. Each piston shaft is aligned with a valve in a row/column orientation. When fluid flow is supplied from a valve and a piston is energized in one direction, a pressure differential induces inflation of each balloon attached to a port on the manifold that is opened. The flow of pressurized medium into and out of the manifold is accomplished using separate supply and exhaust channels in the manifold. These channels are separated using ring gaskets fitted onto the piston shaft. Movement of the piston allows for opening and closing of the fill and exhaust channels.

Depending on the abdominal ailment(s) being simulated, varying degrees of rigidity (pressure supplied to each inflatable element) are implemented to create a given tactile sensation when palpated. Pressure sensor control circuits determine the amount of pressurized medium inflated into each inflatable element and transmits user feedback indicating which inflatables were palpated. All sensor and manifold actuator and valve control is accomplished using an embedded system composed of a printed circuit board (PCB) with a microcontroller. Both the inflation manifold and PCB control module are housed inside the manikin chest cavity for added portability.

In addition to the tactile sensation for palpation examination that the simulator system provides, various sounds associated to the configured ailment may be emitted from the manikin using software-programmed control of audio segments to attached speakers. Patient monitoring data associated with a dynamically changing condition in a simulation routine may be displayed for the user on the GUI interface. Furthermore, the simulator system may include other video displays on or in tandem with the user interface console for related graphical images (X-rays, etc.) and/or related training videos associated with the ailment simulated on the manikin.

The abdominal simulator system of the present invention enables realistic and dynamically changeable abdominal conditions to be simulated for training medical, nursing, and paramedic students to palpate and accurately diagnose a wide range of abdominal ailments and/or conditional expressions thereof. The associated user control interface enables an operator to dynamically simulate a comprehensive training environment, including changing conditions, associated sounds, medical images, and training videos for a wide range of abdominal ailments (e.g., appendicitis, hernia, enlarged spleen) in an instantaneous fashion.

Other objects, features, and advantages of the present invention will be explained in the following detailed description of the invention having reference to the appended drawings.

BRIEF DESCRIPTION OF DRAWINGS

FIG. 6A shows an angled view of the piston shaft and FIG. 6B shows the inflation manifold.

FIG. 7A shows an external perspective cross-cut view of the piston shaft and FIG. 7B shows the inflation manifold.

DESCRIPTION OF PREFERRED EMBODIMENTS

Figure 1:
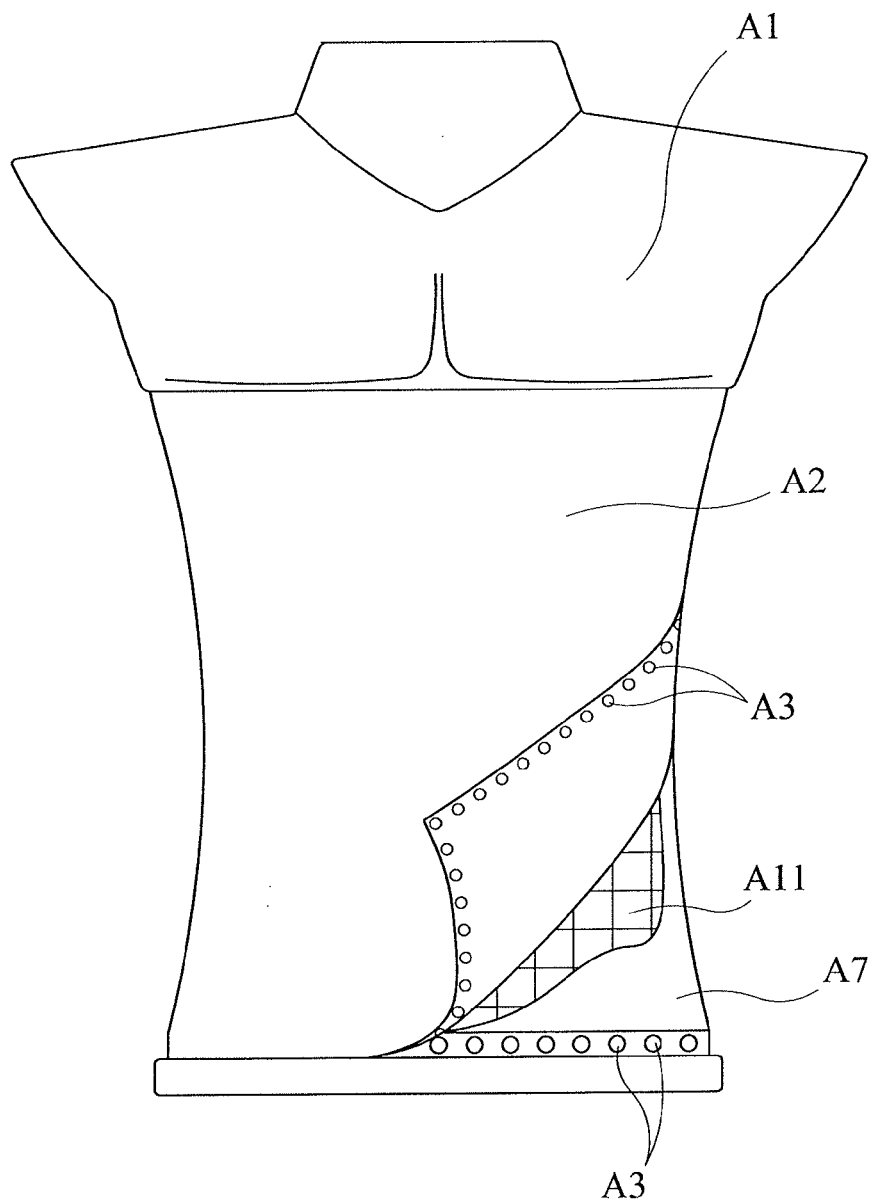
FIG. 1 is an external perspective view of a preferred embodiment of a patient manikin for abdominal training simulations in accordance with the present invention.

In the following detailed description of the invention, certain preferred embodiments are illustrated providing certain specific details of their implementation. However, it will be recognized by one skilled in the art that many other variations and modifications may be made given the disclosed principles of the invention.

REFERENCED PARTS AS NUMBERED IN THE DRAWINGS

A1 Manikin torso shell
A2 Synthetic skin made from silicone compound
A3 Fastening snaps for synthetic skin piece
A4 Indented mounting rim for synthetic skin
A5 Single membrane of low elastic modulus material fused to inflatables
A6 Inflation manifold
A7 Synthetic bone tissue for iliac crests
A8 PCB for simulator control
A9 synthetic bone tissue for ribcage
A10 Single inflatable membrane cell made from rubber polymer
A11 Inflatable grid
A12 Tubing connecting the manifold, pressure sensor, and inflatable membrane together
A13 Ported pressure sensor
A14 Inflatable membrane support structure
A15 Single cell of the inflatable support structure
A16 Back of single cell of the inflatable support structure
A17 Piston shaft
A18 Cross-section view of piston shaft
A19 Ring gasket
A20 Cross-section view of ring gasket
A21 Cylinder tube that houses the piston shaft
A22 Cross-section view of A21
A23 Fill port; Cylinder tube connected to valve that allows or inhibits fluid flow
A24 Cross-section view of A23
A25 Exhaust port; Cylinder tube used to exhaust inflatable membranes
A26 Cross-section view of A25
A27 Port connecting inflatable tubing to the manifold
A28 Areal cross-section of A27
A29 Threaded plug screwed into manifold used to stop fluid leakage
A30 Electronic fluid valve (could be either pneumatic or hydraulic)
A31 Electronic actuator (could be linear actuator, push/pull solenoid, air valve, or the like)
A32 Connector type to attach tubing to manifold
B1 Microcontroller
B2 SPI level converter
B3 Analog to digital converter
B4 ADC connector
B5 Input/Output expander
B6 Input/Output expander connector
B7 UART level converter
B8 USB/Ethernet adapter
B9 Bluetooth/WiFi converter In a simplified embodiment, the inflatable element is shaped like a balloon into which an inflation needle coupled to the end of the inflation tubing is inserted. The inlet to the balloon simply wraps around the inflation tubing end and is sealed using a tie fastener or small hose clamp. A manifold for distribution of a pressurized medium such as air or liquid couples the tubings from the inflatable elements to a source of pressurized medium, for example, a portable air compressor or tank of compressed air. The manifold may have an array of valve-control knobs that controls the supply of pressurized medium into the inflatable elements. Using a simulation control routine for a specific abdominal ailment, the operator can control inflation or deflation to each of the inflatable elements for a calculated amount of time, in order to configure the abdominal cavity for a desired ailment.

In an alternative, more mechanically complex embodiment, the abdominal cavity contains a grid of rows and columns of inflatable elements made of semi-rigid material to retain a defined shape and spanning the entire abdominal cavity. Inflation is accomplished using an inflation manifold system connected to the inflatable elements via tubing. For a pressurized medium of compressed air, the manifold may have moveable ported slats aligned in row/column format where each slat is individually controlled using push/pull solenoids. An airbox is used in the manifold design to create a pressure differential to induce inflation of each element when a port to the element is opened. The flow of air into and out of the manifold is accomplished using a separate supply and exhaust valve solenoid. Depending on the abdominal ailment(s) being simulated, varying degrees of rigidity (or pressure in each element) are implemented to create a given tactile sensation when palpated. Pressure sensor control circuits determine the amount of air inflated into each element and transmits user feedback indicating which inflatables were palpated.

A particularly preferred embodiment of the dynamically-changeable abdominal simulation system in accordance with the present invention will now be described.

Physical Layout

FIG. 1 shows a perspective view of a preferred embodiment of the present invention in its fully assembled state. The manikin torso shell A1 is presented with an attached synthetic skin covering A2. The synthetic skin covering is partially removed to reveal the synthetic bone tissue A7, inflatable membrane grid A11, and the fastening snaps A3 used to attach the skin to the manikin torso. There are, however, many attachment methods that can be employed to keep the skin in place, such as polyethylene hard snaps, mushroom head DualLock Velcro™, hook and lock Velcro™, and the like. The synthetic skin covering the abdominal cavity of the manikin's torso may be a sheet of silicone underlined with thick foam, such as the synthetic skin sold by LifeLike BioTissues, of London, Ontario, Canada. The manikin torso is meant to be mobile and can be moved and placed on any flat surface.

Figure 2:
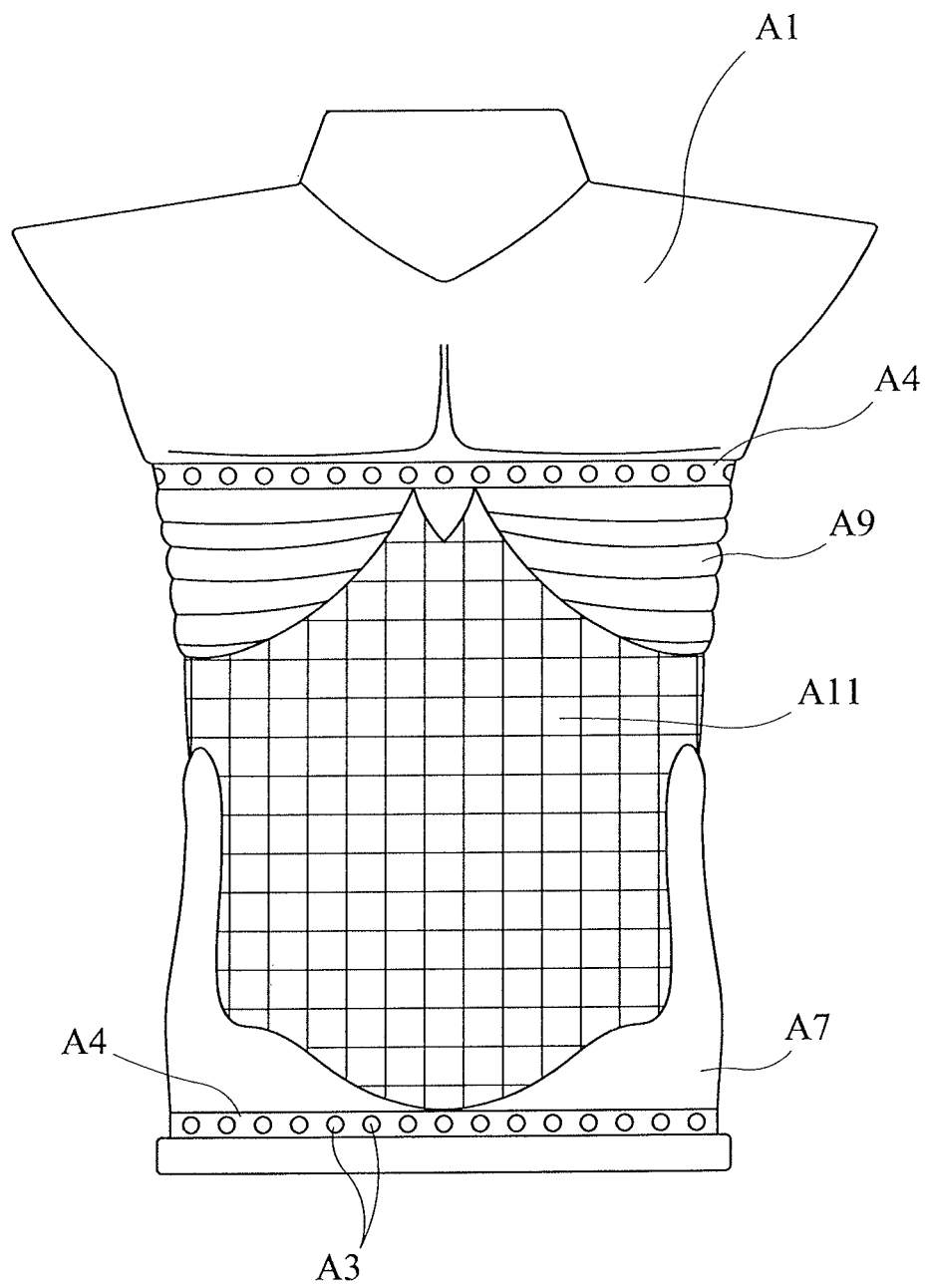
FIG. 2 is an external perspective view of the manikin torso with synthetic skin removed and inflatable grid and synthetic bone tissue is revealed.

FIG. 2 shows a top view of the manikin A1 with the synthetic skin piece removed and the inflatable cells A10, synthetic bone tissues A7 and A9 revealed. Additionally, the indented mounting rim A4 and fastening snaps A3 are revealed. The inflatable cells A10 are aligned in a grid A11 and held together by a single membrane of low elastic modulus material A5 with the face of each A10 inflatable fused onto the bottom of A5.

Figure 3A:
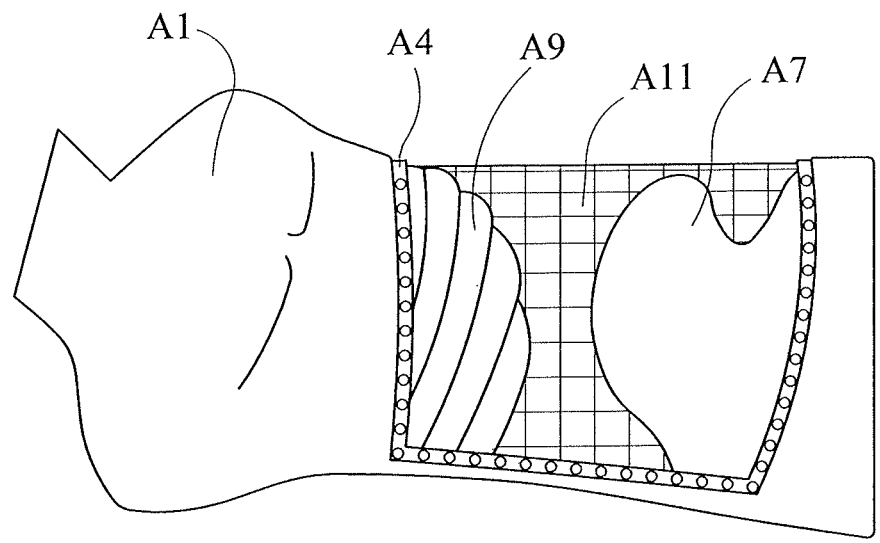
FIG. 3A shows a side view of the manikin torso without synthetic skin to reveal the inflatables grid.
Figure 3B:
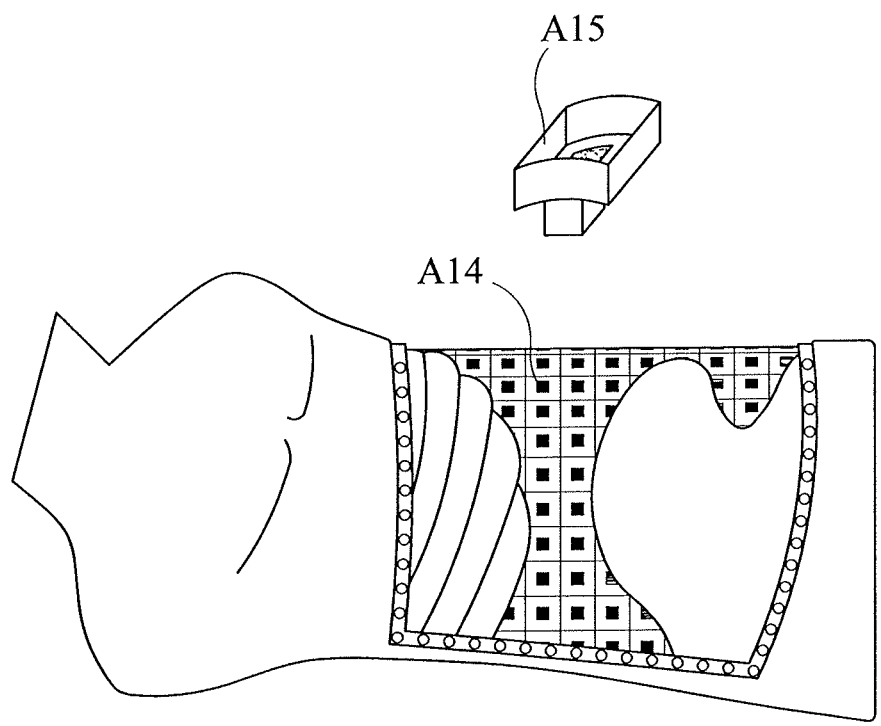
FIG. 3B shows the inflatables grid support structure with inflatables removed.

FIG. 3A shows a side view of the manikin torso with the synthetic skin removed and FIG. 3B shows it with the inflatable elements removed. In these views the sides of the synthetic bone tissues for the iliac crests A7 and ribcage A9 are shown. FIG. 3A shows the inflatable cells A10 fused to a single membrane flap spanning the abdominal cavity. A portion of the membrane flap A5 extends partially past the perimeter inflatables fused to it. This extra material of A5 is used to attach A5 to the underside of the abdominal cavity rim and the synthetic bone tissues to ensure the inflatable grid stays in place. FIG. 3B shows the inflatable membrane grid A11 removed, revealing the underlying inflatable membrane support structure A14. A zoomed in view of a single cell of the inflatable support structure A15 is also shown.

Figures 4A, 4B, 4C:
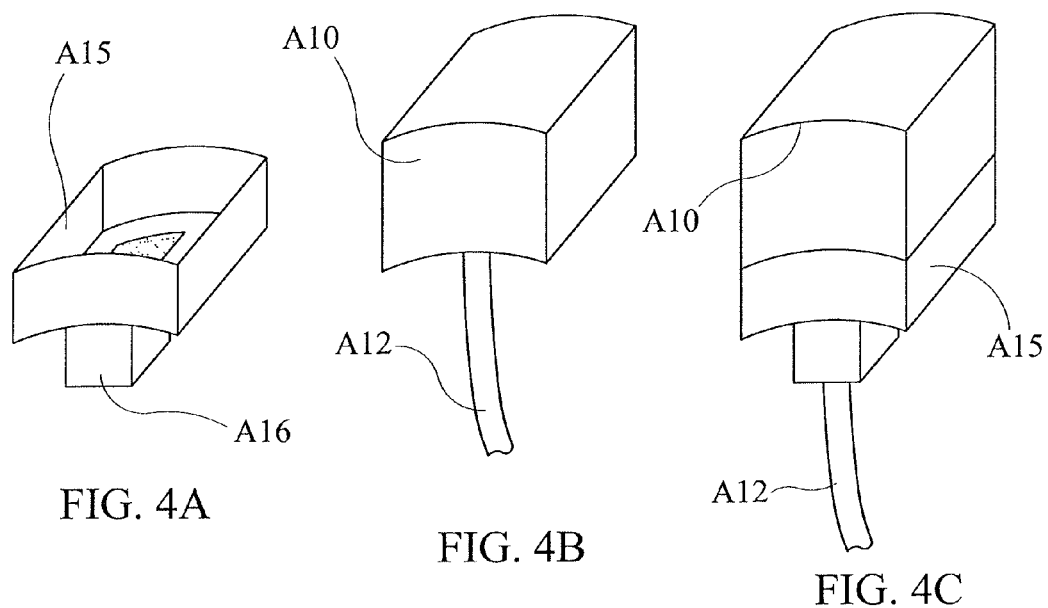
FIGS. 4A, 4B and 4C show angled views of the construction of an inflatable membrane and single cell of the support structure separated and combined.

FIG. 4 is an angled view of the components that make up the inflation structure. A15 has a hole A16 at its base that tubing A12 connecting the inflatable membrane to the manifold is guided through. The inflatable membrane A10 then seats inside of the cell structure A15 and can be adhered to the cell in a number of way. Additionally, A10 can be fused to the perimeter of the inflation support structure cell so that both A10 and A15 function as the inflatable membrane. The inflatable membranes A10, receive pressurized medium via tubing A12 that will run from the base of the inflatable to the fitting A32 of the manifold system.

Figure 5:
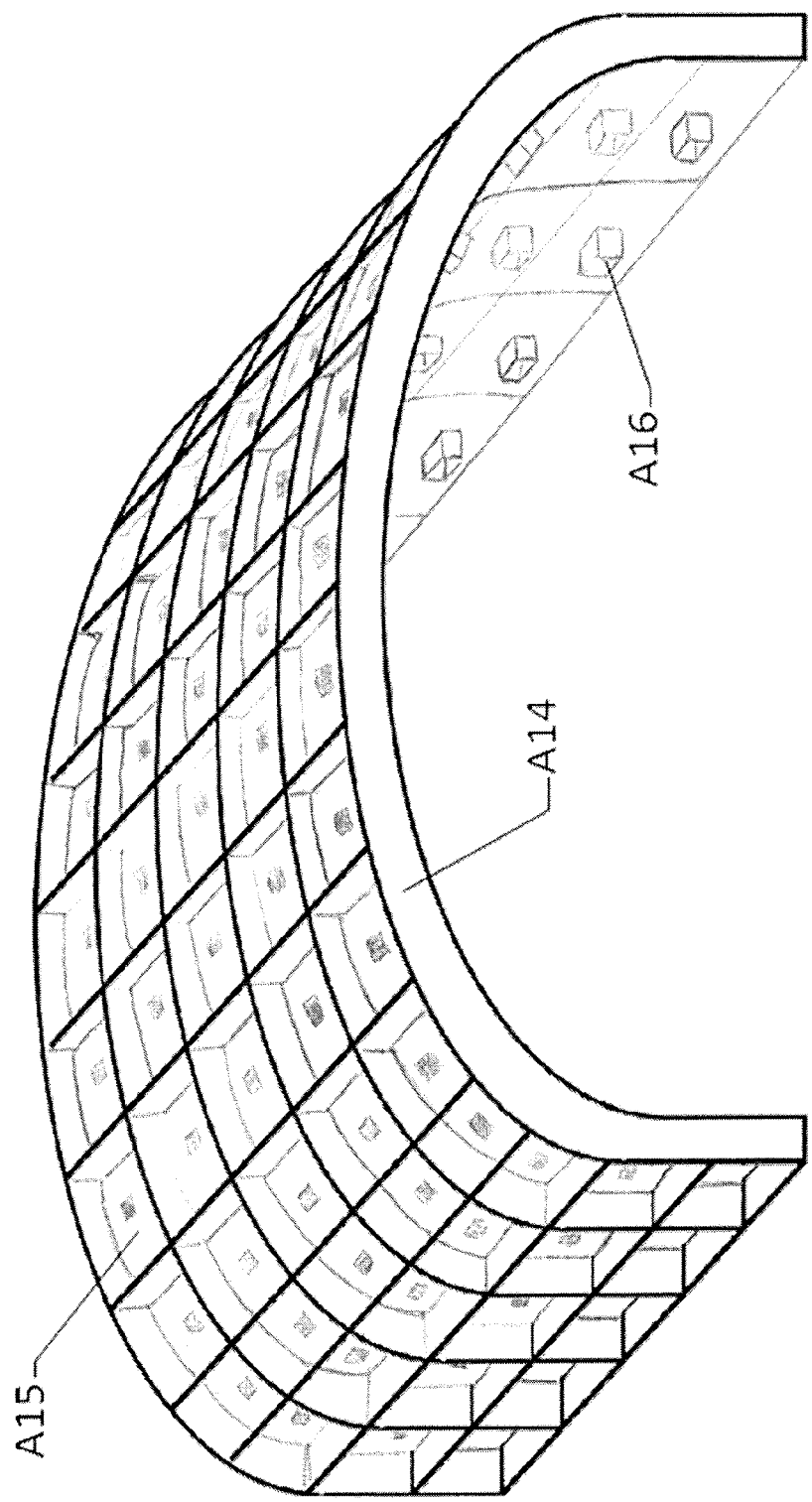
FIG. 5 is an angled view of the inflatable support structure that is attached to the inside of the manikin abdominal cavity and is used keep the inflatable membranes in place.

FIG. 5 shows each individual support cell A15 is combined into a grid of cells to form the overall inflation support structure A14. The support structure A14 is attached to the base of the manikin's abdominal cavity and the shape of the structure follows the contour of the manikin's abdomen. Since the manikin torso shell is open on the sides of the abdominal cavity, this allows for the inflatables to be positioned and palpated on the sides of the abdomen, which is what takes place during an abdominal examination. The mechanical and electrical components can be mounted in the upper region of the hollow manikin or under support structure A14. There are two main parts to this area: the printed circuit board A8 and the manifold A6, all connected by wires. The PCB will contain the microcontroller and integrated circuits required to control the dynamics of the system. The manifold will contain the actuators, valves, piston shafts, and the grid assembly.

Mechanical Operation

Figure 10:
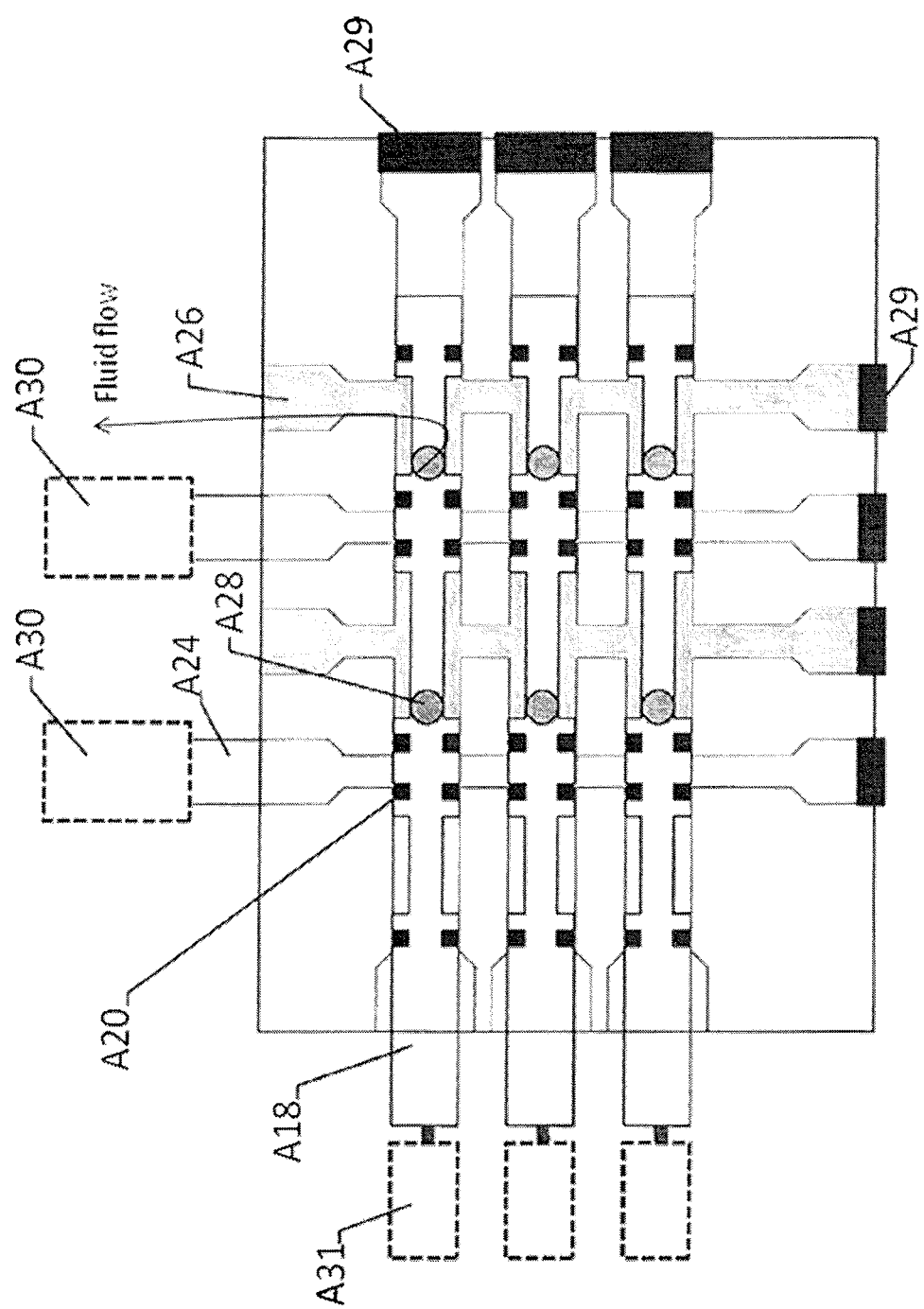
FIG. 10 is an external perspective cross-cut view of the inflation manifold with the piston shafts inserted and each piston shaft is energized to represent the exhaust position.
Figure 11:
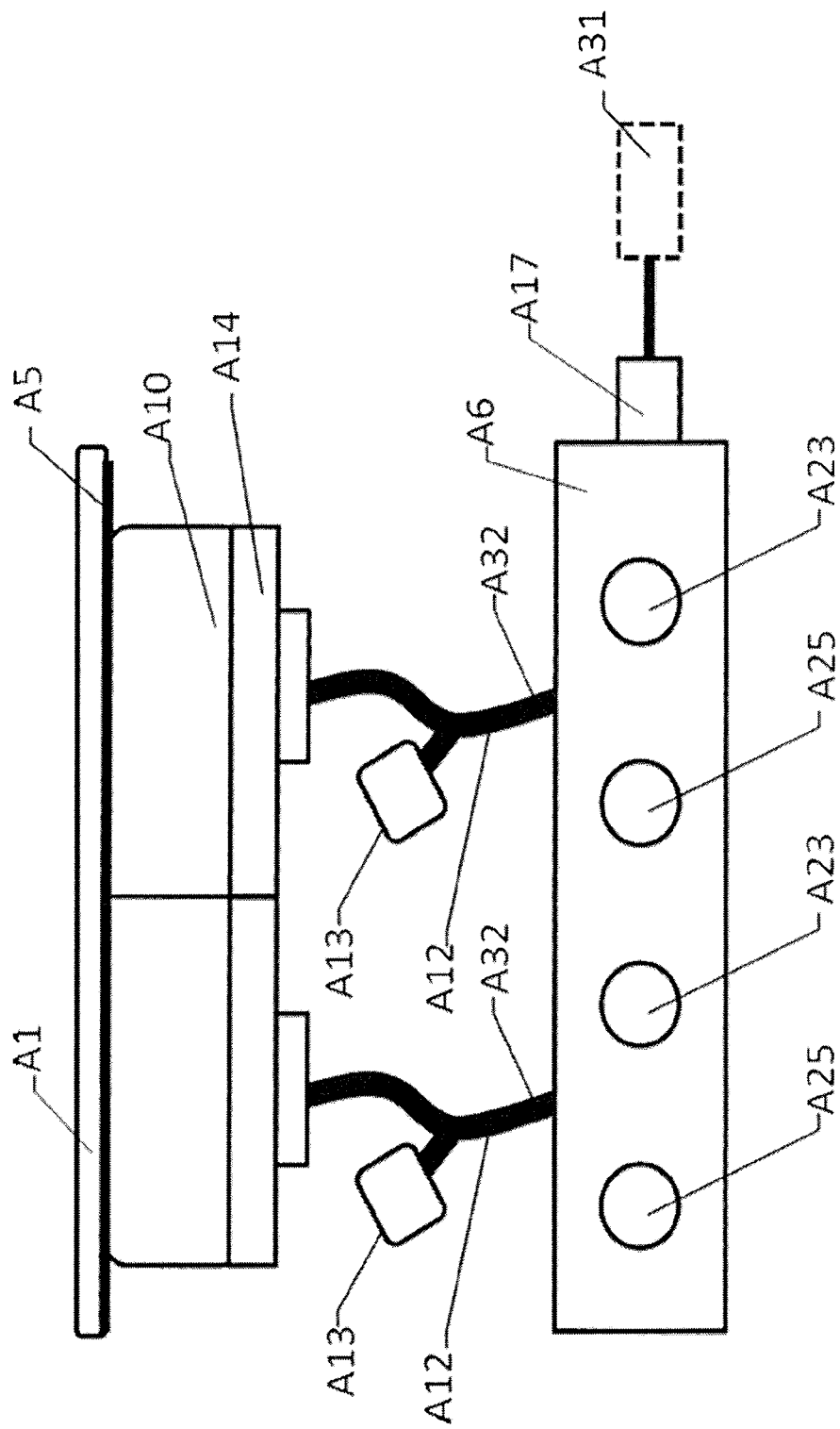
FIG. 11 is a generalized diagram of the components that make up the inflation control system.

FIG. 11 is a side view of a block diagram presenting the functional components of the inflation control system. From the manifold A6, tubing A12 is used to connect a ported pressure sensor A13 and the inflatable membrane A10 together. Using this connection method the pressure sensor A13 is able to evaluate the pressure of the inflatable it is connected to without having to be located inside the inflatable A10. Pressurized medium flows into and out of the manifold A6 (described in more detail in FIG. 9 and FIG. 10) and is moderated with electronic valves A30, which are controlled by the microcontroller A8. Valves A30 control whether or not pressurized medium is flowing into the manifold as well as what channel it flows into. Electronic actuators A31 control pressurized medium flow into the inflatable membranes by shifting in a direction that opens access to a specific port A28. Valves A30 can either be pneumatic and connected to an air compressor as the air source for gaseous fluid, or they can be hydraulic valves connected to a hydraulic pump as a liquid source for liquid fluid. For pressurized medium to reach the inflatables, it must pass through valve A30 and into a specific channel (formed by the seals from the ring gaskets A20 on the piston shaft A18).

Figure 8:
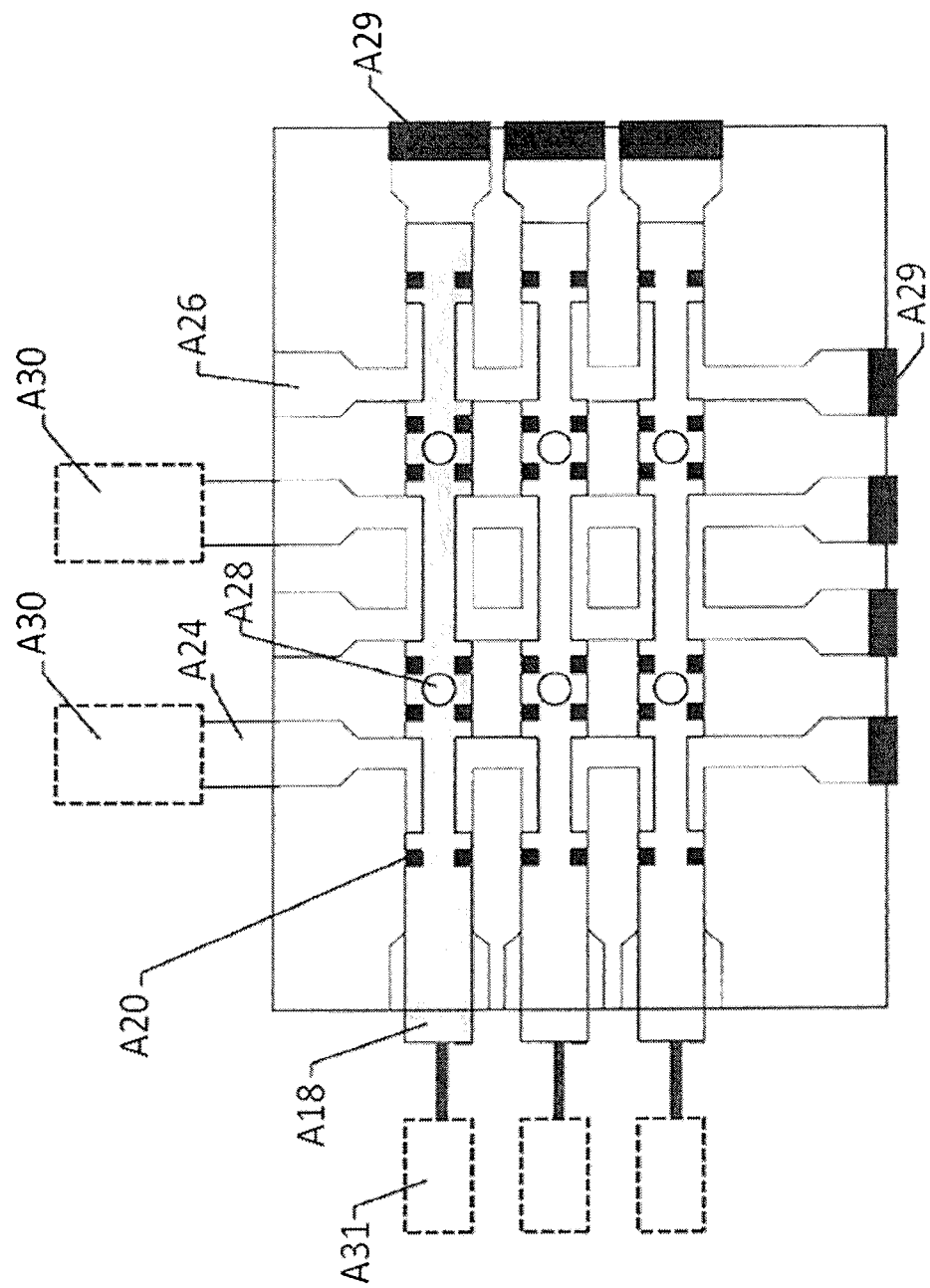
FIG. 8 is an external perspective cross-cut view of the inflation manifold with piston shafts inserted and valves and actuators connected.
Figure 9:
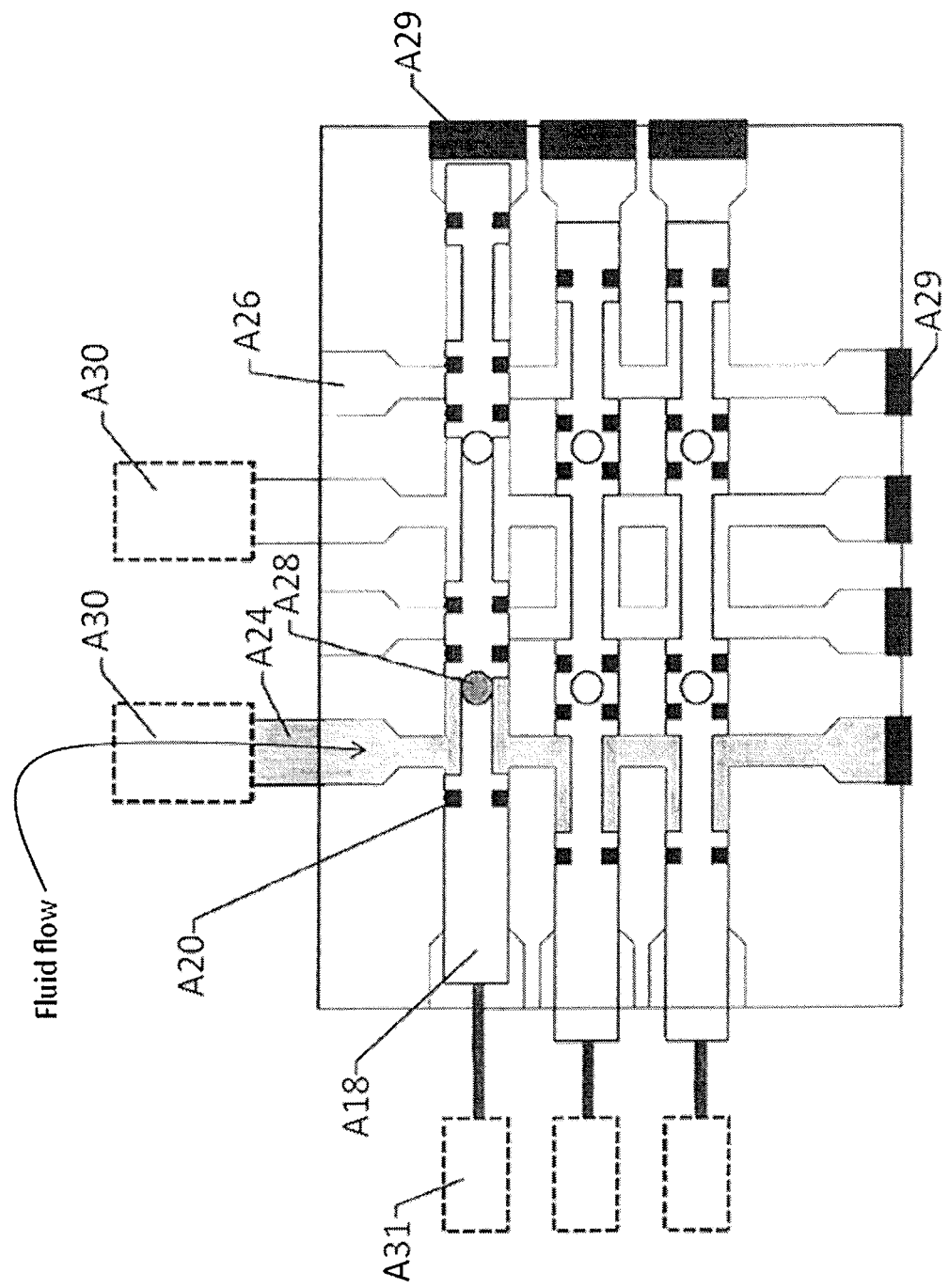
FIG. 9 is an external perspective cross-cut view of the inflation manifold with the piston shafts inserted and one piston is energized to represent the fill position.

An example channel for pressurized medium flow can be seen in FIG. 9 in the shaded region for clarity. In this figure pressurized medium is flowing from a source and through the valve A30 that has been opened by electronic control via the software interface and PCB. The pressurized medium fills the channel (shaded area) established by the seals made from the ring gaskets A20. The top actuator A31 has been energized and has shifted to the right making one of the ports A28 (shaded) open. The pressurized medium flowing into the manifold creates a pressure differential between the channel and the inflatable membrane which causes pressurized medium to flow into the inflatable A10. Once the inflatable A10 reaches a predefined pressure reading (configured by the software and sensed by the pressure sensor A13), the PCB A8, energizes the actuator A31 again to shift the piston shaft A18 into a neutral state as shown in FIG. 8. This state does not allow any pressurized medium to flow out of the inflatable and therefore the pressure configured for is maintained. A display of the construction and operation of the manifold system is described with respect to FIG. 6 to FIG. 10.

FIG. 6A shows a piston shaft for and FIG. 6B shows a manifold system with 6 inflatables. To increase the number of inflatables the manifold can control, a manifold can be fabricated with more intersecting tubes that will connect to valves and actuators. The manifold block A6 is made from one piece of machined metal or hard plastic. There is a grid of intersecting tubes that are threaded at the edge in the portion of each tube that is of larger diameter. One end of each tube is sealed by a threaded plug A29. The threaded ports A27 intersect with each of the cylinder tubes A21 that houses the piston shafts A28. One set of intersecting tubes A23 connect to valves that will pump pressurized medium into the manifold. Another set of tubes A25 are used as the exhaust channel to empty fluid from the inflatables. The electronic actuators A31 are physically connected to the piston shafts 17B. To reduce the wear the piston shafts will experience over time due to friction and to keep the system sealed, well-lubricated ring gaskets A19 are attached to machined grooves in the shaft A17. FIG. 11 presents a side view of the inflation manifold with two inflatables and their corresponding pressure sensors attached. This view is meant to show how the manifold system will look when it is assembled.

FIG. 7A shows a cross-cut view of the piston shaft and FIG. 7B shows the inflation manifold. The channels for pressurized medium flow are shown without a piston inserted.

FIG. 8 shows a cross-cut view of the inflation manifold with the piston shafts inserted into the neutral position (no pressurized medium flow into or out of the inflatables) and actuators and valves attached. One piston shaft is shaded for clarity.

FIG. 9 shows a cross-cut view of the inflation manifold with the piston shafts inserted and one piston shaft is energized to represent the fill position. One valve is energized to allow pressurized medium to flow. The channel (separated by ring gaskets) that is filled with pressurized medium is shaded for clarity, and the port A28 connecting the inflatable membrane that is being filled is shaded for clarity.

FIG. 10 shows a cross-cut view of the inflation manifold with the piston shafts inserted and each piston shaft is energized to represent the exhaust position. No valves A30 are energized to hinder pressurized medium flow into the manifold. The channels (separated by ring gaskets) that are being exhausted are shaded for clarity, and the ports A28 connecting the inflatable membranes that are being exhausted are shaded for clarity.

During a simulation run, the user selects a preset ailment or uses a custom setup via the GUI. The microcontroller then commands the specified actuators and valves to let pressurized medium flow through the manifold and into the proper inflatable membranes A10. The fluid flows into the inflatable until the pressure sensor A13 tells the microcontroller that the proper pressure has been reached, at which time the piston shaft A17 for that particular inflatable will close, leaving it inflated at a specific pressure. The system then successfully alternatives to each set of inflatables until the ailment is properly simulated. When the simulation is finished, the entire grid is opened (i.e., all actuators A31 are energized), the valves A30 are closed to stop pressurized medium flow into the manifold. This causes the pressure differential between the inflatable membranes A10 and the exhaust channels to reverse, which deflates all inflatables.

The system can be compared to a coordinate grid, where each inflatable is located at position (x,y), where x is the piston shaft A17 corresponding to row x, and y is the valve fill channel A23 corresponding to column y. Using this solution, any inflatable in the array can be sourced with fluid by actuating one valve A30 and one actuator A31. This also reduces the amount of mechanical parts needed, which reduces the cost.

Software Control (Embedded System)

Figure 12:
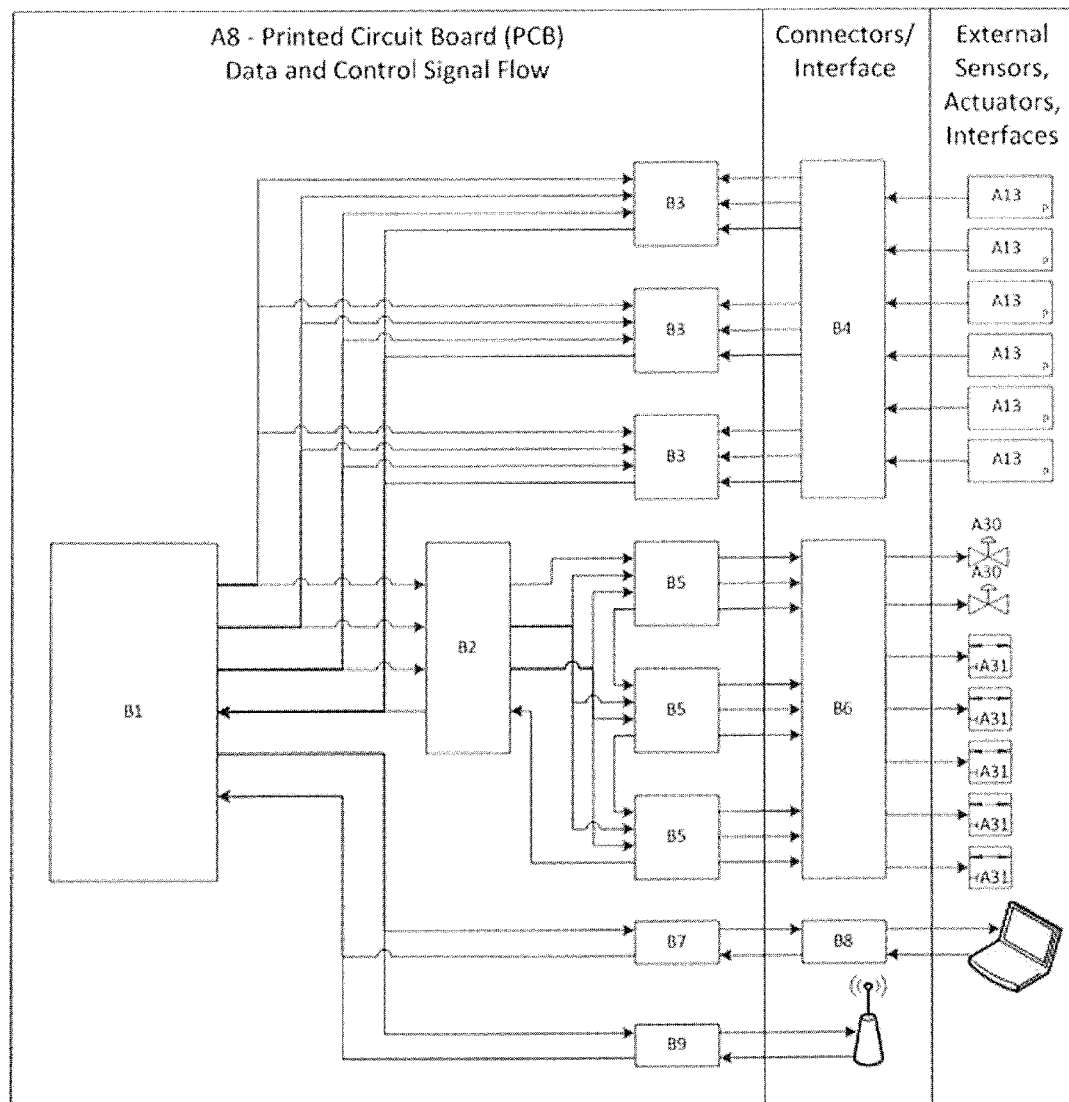
FIG. 12 is a functional block diagram showing the components of an example of the electronic control module.

As shown in an example depicted in FIG. 12, the functions of the printed circuit board A8 are controlled by an on-board microcontroller B1. The microcontroller B1 is directly connected to the external analog to digital converters (ADC) B3. Each ADC B3 will have multiple analog inputs to reduce the number of required devices. The ADCs B3 get analog signals from connector B4, which connects to pressure sensors A13. The input/output expanders B5 are used for controlling the electronic actuators A31 and valves A30 digitally. The electronic actuators A31 push and pull the piston shaft to dictate fluid flow to the inflatable membranes and the electronic valves A30 control pressurized medium flow into the manifold A6. The array of B5 chips are daisy-chained to reduce the number of connections. A30 and A31 are plugged into connector B6 on the PCB. To provide a higher voltage digital signal, the I/O expanders use a higher voltage and are controlled by digital signals amplified through an SPI level converter B2. An external interface to control the board is provided through a UART level converter B7 and USB or Ethernet adapter B8, or using a UART to Bluetooth or WiFi converter from the microcontroller B1.

Software Control (Device to Control PCB)

Figure 13:
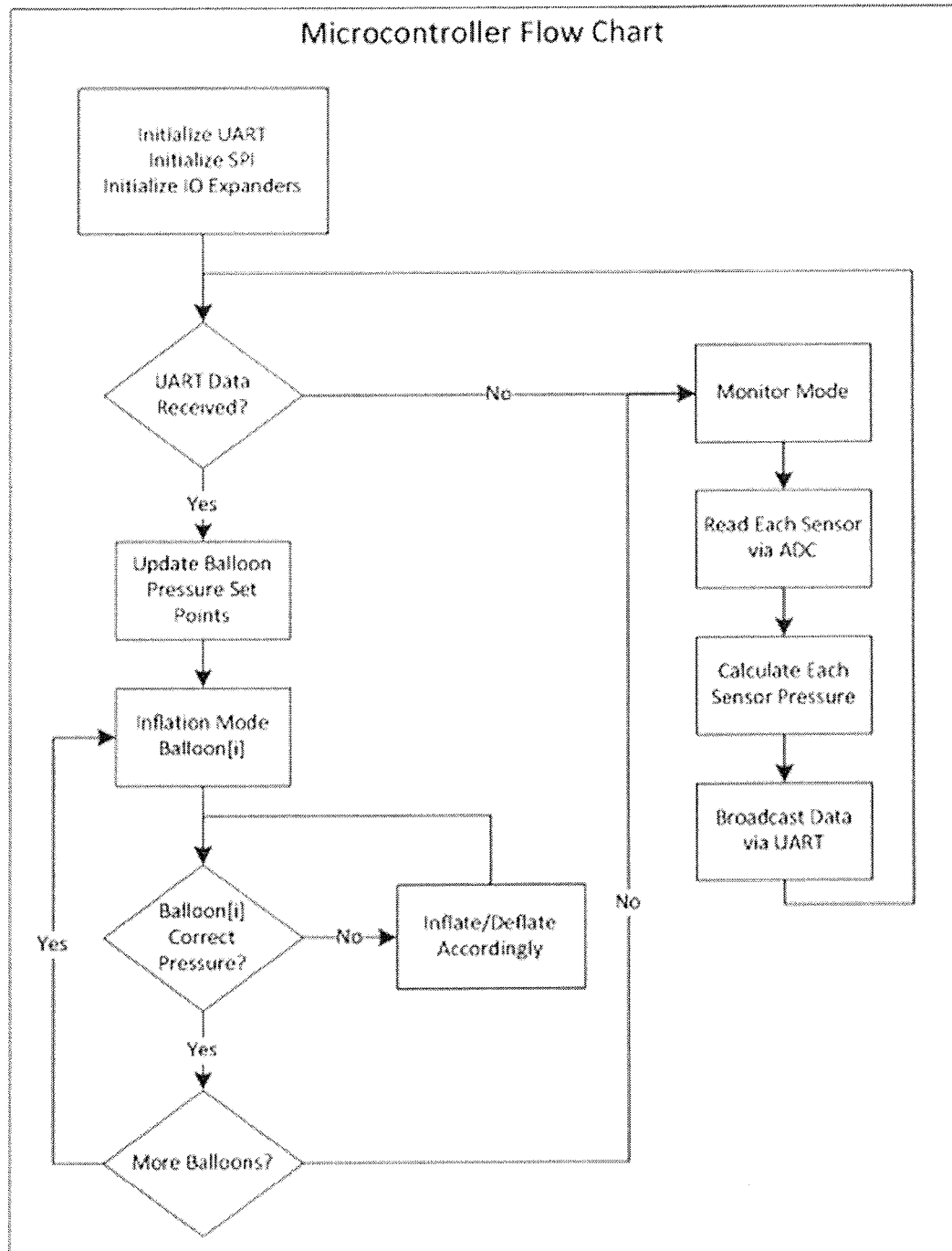
FIG. 13 is a logic diagram showing the flow control of the embedded system.

FIG. 13 is a flow chart illustrating an example of the logic steps executed by the microcontroller for the embedded system. For a simulation run, the user can select a preset ailment or establish a custom setup via the GUI to initialize the UART, SPI, and I/O expanders of the microcontroller B1. The microcontroller B1 commands the specified valves A30 and actuators A31 to let pressurized medium flow through the manifold and into the proper inflatable cells to their proper set points. Pressurized medium flows into the inflatable cells until the pressure sensor A13 tells the microcontroller that the proper pressure has been reached, at which time the valves A30 and actuators A31 for that particular inflatable cell will close, leaving it inflated at a specific pressure. The system continues to set all the inflatable cells so that the selected ailment is properly simulated. When the simulation is finished, the entire grid is opened (i.e., all the actuators shift the pistons as in FIG. 10). This causes the inflatables A10 to deflate.

TABLE 1 illustrates an example of a software routine in pseudocode that may be programmed for execution by the microcontroller for the embedded inflation system control.

The user control GUI can operate on any associated computer, laptop and/or mobile device to control and monitor the abdominal simulator system. The GUI interface is designed to be intuitive for the first-time user and provide advanced features for more experienced users. A quick-start feature may use a dropdown menu to select an abdominal ailment and a start button to begin simulation. Additional features may allow experienced users to set inflatable parameters to customize their own medical condition simulations. Each inflatable having its own pressure sensor also enables the system to monitor and collect data on which inflatable areas were pressed during a palpation exam. This allows teachers and trainers to determine if the student demonstrated proper technique in their palpation examination, thereby providing an effective simulator training tool for students, teachers, and trainers.

In addition to the tactile sensation for palpation examination that the simulator system provides, various sounds associated to the configured ailment may be emitted from the manikin using software-programmed control of audio segments to attached speakers. Patient monitoring data associated with a dynamically changing condition in a simulation routine may be displayed for the user on the GUI interface. Furthermore, the simulator system may include other video displays on or in tandem with the user interface console for related graphical images (X-rays, etc.) and/or related training videos associated with the ailment simulated on the manikin.

Other embodiments for the array of inflatable elements, inflation manifold, and/or electronic control module may be designed consistent with the principles of the present invention disclosed herein. For example, instead of an x-y grid of inflatable cells, the array of inflatable elements may employ anatomically-correct and/or anatomically-simulated organ and tissue elements for emplacement in the manikin abdominal cavity. The inflation manifold may be formed as an array valve unit under microprocessor control, which is coupled to the tubings supplying pressurized medium to the inflatable elements. Instead of an embedded unit, the electronic control unit may be configured as an external component integrated with an external computer for the user interface, which communicates by wireless Bluetooth links to electronically-actuated valve actuators embedded with the inflation manifold for the inflatable elements.

The array of inflatable elements may be designed for a wide range of simulated abdominal ailments, such as appendicitis, hernia, and enlarged spleen, as well as other disorders such as ectopic pregnancy, abdominal cancers, tumors, infections, and other ailments that may occur within the torso, both large and small. Other types of patient simulator systems for other areas of the body may be designed consistent with the principles of the present invention, such as for internal surgical training, for tactile cranial, vaginal, birth canal, rectal or intestinal examinations, etc., and/or for tactile examination of animal species, such as livestock.

It is to be understood that many modifications and variations may be devised given the above description of the general principles of the invention. It is intended that all such modifications and variations be considered as within the spirit and scope of this invention, as defined in the following claims.

TABLE 1

```
initialize UART
initialize SPI
initialize IO Expanders
do forever
    update mode
        check UART receiver buffer
        update setpoint array
```

TABLE 1-continued

```
        end update mode
        inflation mode
            for all i
                update setpoint[i]
                update sensor[i]
                    while(sensor[i] != setpoint[i])
                        if sensor[i] < setpoint[i]
                            inflate balloon[i]
                        else if sensor[i] > setpoint[i]
                            deflate balloon[i]
                        update sensor[i]
                    end while
            end for
        end inflation mode
        monitor mode
            for each sensor
                update each ADC
                convert ADC to pressure
                transmit sensor
            end for
        end monitor mode
end do forever
```

The invention claimed is:

1. A pressure feedback network for an abdominal simulator system having a patient manikin provided with an abdominal cavity containing an array of a plurality of inflatable elements emplaced within the abdominal cavity covering respectively distinct areas of pressurization over a length and a width of the abdominal cavity, each inflatable element being supplied with pressurization fluid through a pressurization channel from a source of pressurization under separate and independent pressurization control from other pressurization channels for the other inflatable elements, so that each inflatable element can be independently controlled by being supplied with pressurization fluid to inflate or deflate the inflatable element, wherein said pressure feedback network comprises a like plurality of pressure sensors each provided for a respective one of said plurality of inflatable elements by coupling each one of said pressure sensors to a respective pressurization channel of a respective inflatable element for detecting changes in pressurization levels of the pressurization fluid in the pressurization channel, and a signal network coupling pressurization level detection outputs from the plurality of pressure sensors to a pressure feedback analyzer for analyzing differences in pressurization levels of pressurization fluid supplied to the inflatable elements and pressurization levels due to hand pressures applied by a palpation trainee to the array of inflatable elements within the abdominal cavity of the abdominal simulator system, and a display interface coupled to said pressure feedback analyzer for displaying the pressurization levels due to hand pressures applied by the palpation trainee to the array of inflatable elements of the abdominal simulator system, whereby the pressure feedback network is used to display the hand pressures applied by the palpation trainee in a training simulation for purposes of palpation training.

2. The pressure feedback network for an abdominal simulator system according to claim 1, wherein the array of inflatable elements is arranged as a grid of inflatable cells in a plurality of x rows and y columns defining distinct unit locations of pressurization and the array of pressure sensors are respectively located proximate the x-y locations of the inflatable elements.

3. The pressure feedback network for an abdominal simulator system according to claim 1, wherein each pressurization channel is formed by tubing connected to a respective inflatable element, and a corresponding pressure sensor is coupled to the pressurization channel tubing proximate its connection to the respective inflatable element.

4. The pressure feedback network for an abdominal simulator system according to claim 1, wherein said pressure feedback analyzer is coupled for communication with an external computer that operates the display interface for the user.

5. The pressure feedback network for an abdominal simulator system according to claim 4, wherein said pressure feedback analyzer is coupled by a wireless communication link to the external computer.

6. The pressure feedback network for an abdominal simulator system according to claim 1, wherein said pressure feedback analyzer enables the display interface to display whether a palpation trainee has performed a proper technique for palpation training.

* * * * *